United States Patent
Martinsen et al.

(10) Patent No.: US 9,954,767 B2
(45) Date of Patent: Apr. 24, 2018

(54) INTERNET CONTROL MESSAGE PROTOCOL FOR COMPLETING A SECONDARY PROTOCOL TRANSACTION

(71) Applicant: Cisco Technology, Inc., San Jose, CA (US)

(72) Inventors: Paal-Erik Martinsen, Aas (NO); Daniel Wing, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 14/573,830

(22) Filed: Dec. 17, 2014

(65) Prior Publication Data

US 2016/0182357 A1 Jun. 23, 2016

(51) Int. Cl.
| H04L 12/28 | (2006.01) |
| H04L 12/761 | (2013.01) |
| H04L 12/721 | (2013.01) |
| H04L 12/749 | (2013.01) |
| H04L 12/801 | (2013.01) |
| H04L 12/841 | (2013.01) |
| H04L 12/833 | (2013.01) |

(52) U.S. Cl.
CPC ............ *H04L 45/16* (2013.01); *H04L 45/44* (2013.01); *H04L 45/741* (2013.01); *H04L 47/17* (2013.01); *H04L 47/2458* (2013.01); *H04L 47/286* (2013.01)

(58) Field of Classification Search
None
See application file for complete search history.

(56) References Cited

U.S. PATENT DOCUMENTS

| 5,991,300 A | 11/1999 | Tappan |
| 6,104,695 A | 8/2000 | Wesley et al. |
| 7,602,817 B2 | 10/2009 | Ramalho |
| 7,633,879 B2 | 12/2009 | Ramalho |
| 7,634,554 B2 | 12/2009 | Cook |
| 7,738,383 B2 | 6/2010 | Wing et al. |
| 8,248,942 B2 | 8/2012 | Wing et al. |
| 8,374,095 B2 | 2/2013 | Boutros et al. |
| 9,253,237 B2 | 2/2016 | Wing et al. |
| 9,313,246 B2 | 4/2016 | Wegger et al. |
| 2008/0091811 A1* | 4/2008 | Wing ................ H04L 12/5695 709/223 |

(Continued)

OTHER PUBLICATIONS

Bonica, et al., Extended ICMP to Support Multi-Part Messages, https://tools.ietf.org/html/rfc4884, Apr. 2007.

(Continued)

*Primary Examiner* — Jutai Kao

(57) ABSTRACT

In one implementation, an endpoint or client device sends a control message into a network to control how a subsequent flow from the endpoint is handled by one or more nodes in the network. A node in the network receives the control message including an encapsulated command and a counter value and modifies the counter value. The node compares the modified counter value to a predetermined limit. When the modified counter value is equal to the predetermined limit, the control message is designated for execution of the encapsulated command. When the modified counter value exceeds the predetermined limit, the control message is forwarded to a subsequent node.

20 Claims, 6 Drawing Sheets

(56) References Cited

U.S. PATENT DOCUMENTS

| | | |
|---|---|---|
| 2008/0151764 A1* | 6/2008 | Wing .................. H04L 41/12 370/248 |
| 2008/0175162 A1* | 7/2008 | Wing .................. H04L 43/026 370/252 |
| 2009/0316697 A1 | 12/2009 | Dakshinamoorthy et al. |
| 2014/0006639 A1 | 1/2014 | Wing et al. |

OTHER PUBLICATIONS

Martinsen, et al., Differentiated Priorities and Status Code-Points Using Stun Signalling (DISCUSS), http://tools.ietf.org/html/draft-martinsen-tram-discuss-00, Feb. 12, 2014.

Rosenberg, et al., Session Traversal Utilities for NAT (STUN), http://tools.ietf.org/html/rfc5389, Oct. 2008.

* cited by examiner

INTERNET CONTROL MESSAGE PROTOCOL FOR COMPLETING A SECONDARY PROTOCOL TRANSACTION

TECHNICAL FIELD

This disclosure relates in general to the field of packet switched networks, and more particularly control messages for encapsulated and delivery a secondary protocol transaction.

BACKGROUND

A packet switch network includes multiple nodes. Each of the nodes is configured to forward data traffic to a next hop node according to routing tables. When an endpoint sends a data packet into the network, the identities of the nodes that will forward the data packet along a path to the destination are unknown. In addition, the path may be different from one flow to the next. Exchanging information between the endpoint and the nodes (routers) is difficult because routers are tailor made to forward packets. All other tasks are secondary and might considerably slow down the packet forwarding capabilities of the router.

Similar problems also exist in software defined networking (SDN). A SDN controller makes decisions about how traffic is forwarded among the nodes of the network, but the underlying nodes remain responsible for the forwarding of traffic. The SDN controller does not allow a requesting endpoint to send instructions to the underlying nodes. Challenges remain in exchanging communications with on-path routers.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a control message including an encapsulated command and a counter value is received from an endpoint. A node processes the control message by modifying the counter value, and comparing, at a processor, the modified counter value to a predetermined limit. When the modified counter value is equal to the predetermined limit, the node designates the control message for execution of the encapsulated command. When the modified counter value exceeds the predetermined limit, the node forwards the control message to a subsequent node.

An apparatus includes a communication interface and a processor. The communication interface receives a control message including an encapsulated command and a counter value. The processor is configured to modify the counter value and compare the modified counter value to a predetermined limit, wherein when the modified counter value is equal to the predetermined limit. The processor is configured to designate the control message for execution of the encapsulated command and when the modified counter value exceeds the predetermined limit, wherein the processor is configured to cause the communication interface to forward the control message to a subsequent node.

Example Embodiments

Session traversal utilities for network address translation (STUN) is a set of techniques or protocols for discovering the presence of a network address translator. In addition, the internet protocol (IP) address and/or port numbers allocated for user datagram protocol (UDP) messages. STUN may also be utilized for communication with on-path routers. Commands may be added to STUN attributes in the STUN messages that are sent from one client during connectivity checks before connectivity is established or for keep-alive purposes after connectivity has been established. The commands may include the nodes to change a priority for a particular flow, allocate bandwidth or other resources to a particular flow, or otherwise modify how the flow is handled. The commands may be in the form of hints that the network devices may act upon.

Figure 1:
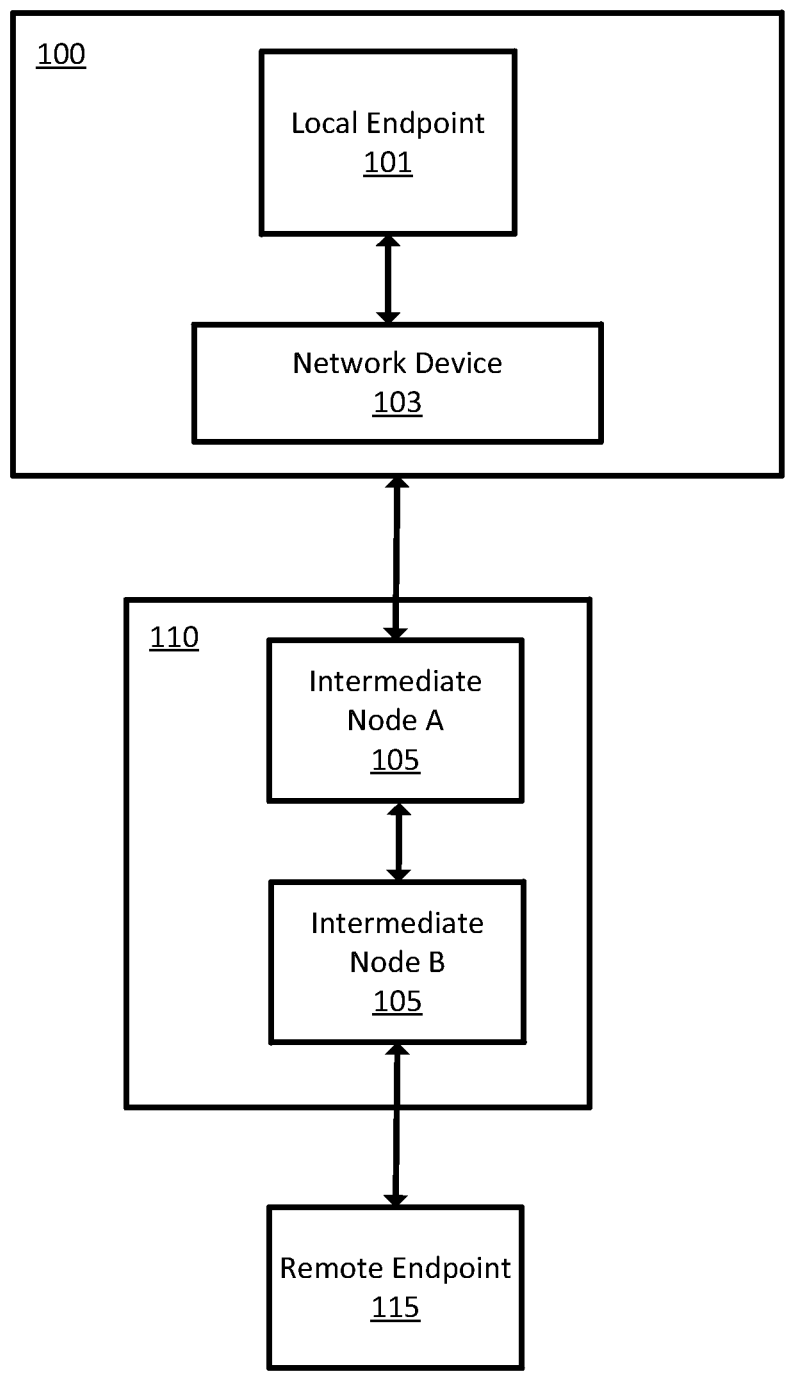
FIG. 1 illustrates an example system for communication with on-path routers.

FIG. 1 illustrates an example system for communication with on-path network devices. A local network 100 includes a local endpoint device 101 and a network device 103, which is in communication and coupled with an external network 110 (e.g., Internet). The external network 110 provides communication with a remote endpoint device 115. The external network 110 includes one or more intermediate nodes 105. The intermediate nodes 105 may be on-path routers, switches, or another on-path device configured to forward data packets in a network. An on-path device may be a device configured to forward packets through the external network 110. More endpoint devices may be included, and any of the endpoint devices may be personal computers, mobile devices, set top boxes, tablet computers, or any computing device configured for network communication. The network device 103 may be a firewall device, a network address translation (NAT) device, or another network device. Additional, different, or fewer components may be included.

The local endpoint device 101 may be configured to generate a control message including a counter value and a command for an on-path router. The command for the on-path router may include a priority setting or a bandwidth setting. The command may be encapsulated using a control protocol or a request/response protocol. The counter value may be a time to live (TTL) or a hop limit. The counter value may be a numerical value that defines a lifetime of the control message. The counter value may define how long the control message is forwarded before being discarded and initiated further action by a forwarding node.

For example, when the counter value is set at N, the Nth device that forwards the control message would discard the control message and generate a response packet. Using the system shown in FIG. 1, when the counter value is set to 3, the control message would reach intermediate node B before a response packet is sent from the intermediate node B to the local endpoint device 101. When the counter value is set to 2, the control message would reach intermediate node A before a response packet is sent from the intermediate node A to the local endpoint device 101.

When the counter value is set to 1, the control message would reach the network device 103, and in response a response packet is sent from the network device 103. When the network device 103 is an access point or wireless access point, the local endpoint device 101 may send the control message to receive information about the local network 100. The information may include an expected bandwidth and/or throughput for the particular stream from the network device 103. The information may include a quality value for the link.

The local endpoint device 101 may select the counter value according to a location of a NAT device such as network device 103. The location (e.g., hop or TTL distance) may be determined using a traceroute command or similar utility. The traceroute command may include successive packets sent across the network with varying values. Return messages produce a list of routers that the packets have traversed.

The local endpoint device 101 may set a timer in connection with the traceroute packets (or an individual timer for each traceroute packet). The local endpoint device 101 compares a time the timer was a started to a time when the packet or corresponding response is returned back to the local endpoint device 101. The difference between the transmission and receipt may be referred to as the round trip time (RTT). The local endpoint device 101 may identify the TTL or hop distance to the NAT device. Subsequently, the local endpoint device 101 may generate the control message with a counter value with the identified TTL or hop distance. However, running traceroute on the endpoint may open up a different port and thus might provide a different path than what media is flowing on.

As the intermediate nodes and/or the network device 103 receive the control message, the devices modify the counter value, for example, by decrementing the counter value. The devices compare the modified counter value to a predetermined limit. The predetermined level may be 0. When the modified counter value is equal to the predetermined limit, the devices may designate the control message for execution of the encapsulated command.

In one example, intermediate nodes and/or the network device 103 may include a packet forwarding processing portion for communication in the forwarding plane and a control messaging processing portion for communication in the control plane. The packet forwarding processing portion may include a fabric (e.g., integrated circuits and forwarding tables) responsible for standard packet forwarding. The control messaging processing portion may include a general purpose or specialized processor configured to analyze the control messages and perform commands encapsulated in the control messages.

When the modified counter value is equal to the predetermined limit, the control message may be forwarded or punted from the packet forwarding processing portion to the control messaging processing portion. Thus, the control message is removed from the very fast packet forwarding process and sent to the slower path for control packet processing. When the modified counter value exceeds the predetermined limit, the control message is forwarded to a subsequent node by the packet forwarding processing portion.

Response messages may be exclusive or (XOR) protected. That is, the responses messages may include an XOR operator associated with the response IP addresses. The XOR operator prevents the NAT device from detecting the IP addresses and removing or replacing the IP addresses. Other types of protection may be used. Any technique that hides the binary pattern of the IP address from the NAT device may be used. The receiving side (e.g., local endpoint device 101) may process the hidden IP address based on an instruction for the type of protection that is used.

Figure 2:
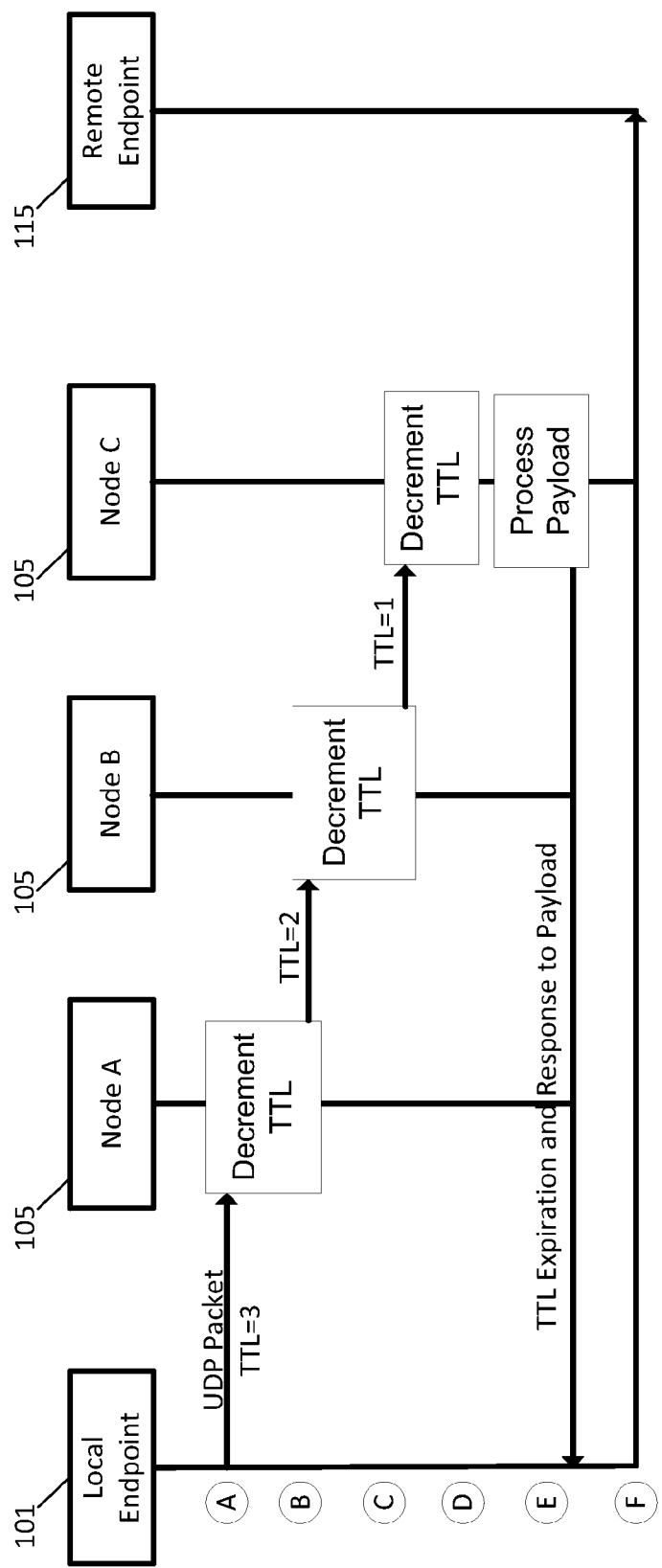
FIG. 2 illustrates an example timing diagram for communication with on-path routers.

FIG. 2 illustrates an example timing diagram for communication with on-path routers. The devices of FIG. 1 are illustrated in FIG. 2, the local endpoint device 101, intermediate nodes A-C 105, and the remote endpoint device 115. Network device 103 is not illustrated but may be between intermediate node A and the local endpoint device 101. Sequences of the timing diagram are described using examples protocols.

At stage A, the local endpoint device 101 may send the control message to the intermediate node A. The control message may be a STUN packet, or any alternative protocol capable of protecting outward facing IP addresses from NAT devices. The alternative protocol may be a request response mechanism that is configured to hide data from the NAT device to avoid rewriting. STUN may be defined by RFC 5389 published in Oct. 2008 on the IETF website. Other versions may be used. The control message may be sent using user datagram protocol (UDP). The control message may include a set of DISCUSS attributes. The DISCUSS attributes may be defined by the IETF website at "draft-martinsen-tram-discuss" and published in 2014. Other versions may be used. The control message also includes a counter value, as illustrated 9 by TTL=3. The counter value of the control message may be a TTL value in IPv4 or hop limit value in IPv6.

At stage B, the intermediate node A receives the control message. The intermediate node A decrements the counter value to TTL=2. The intermediate node A compares determines whether the counter value has reached zero. Because the counter value does not equal zero, the intermediate node A forwards the control message without further processing.

At stage C, the intermediate node B receives the control message. The intermediate node B decrements the counter value to TTL=1. The intermediate node B compares determines whether the counter value has reached zero. Because the counter value does not equal zero, the intermediate node B forwards the control message without further processing.

At stage D, the intermediate node C receives the control message. The intermediate node C decrements the counter value to TTL=0. The intermediate node C compares determines whether the counter value has reached zero. Because the counter value is equal to zero, the intermediate node C processes the control message. The control message may be unpacked through the STUN and/or UDP protocols to read the DISCUSS attribute.

The DISCUSS attribute is a STUN extension that allows for direct information exchange between endpoint and network. The command or DISCUSS attribute may specify a privacy setting, a recording setting, a service setting, bandwidth setting or a priority setting. The privacy setting may specify a level of security or encryption for the particular stream. Thus, the privacy setting may be different than other security policies for the endpoint. The privacy setting may be an increased level of encryption or decreased level of encryption as compared to the normal policy of the endpoint.

The recording setting may specify a recording policy for the particular stream. The recording setting may instruct the node to copy the stream and send the copy of the stream to another location (e.g., a cloud storage server, an anonymity router).

The service setting may be another command that causes the node to take some action. The service setting may instruct the node to scan the file stream for viruses, add captions to the video stream, index the video stream with search words, detect active speakers in a video conference, or translate the audio or text of the stream.

The bandwidth setting may specify a bandwidth value that determines how much bandwidth should be reserved for a flow or stream associated with the control message. The bandwidth value may include an average bandwidth component and a maximum bandwidth value. The intermediate node C may reserve resources (e.g., a number of processing units or cores) to dedicate to forwarding the flow associated with a control message for a predetermined time period. The time period may also be set by the control message.

The priority setting may be a numerical value that ranks a priority for forwarding a flow or stream associated with the control message with respect to other flows. The intermediate node C may forward packets sequentially according to the numerical value. In one example, packets with the highest priority value are forwarded before any packets of the next highest priority value are forwarded. In another example, packets are organized in subsets by wait time, and then forwarded according to priority value within the subsets.

At stage E, in addition to processing the command encapsulated in the control message, the intermediate node C may generate a response message. The response message may be an Internet Control Message Protocol (ICMP) message. The response message may be a multi-part message as provided by Extended ICMP to Support Multi-Part Messages, published in April 2007 as RFC 4884 on the IETF website. The multi-part message may include portions of any arbitrary length as defined by a length field. Thus, a STUN response may be included in the multi-part message using ICMP, even with the STUN response initiated by another protocol (e.g., UDP). Other variations may be used. The response message may be generate in response to the expiration of the counter value (e.g., an ICMP TTL exceeded message). The local endpoint device 101 receives the response message including the DISCUSS response encoded inside the multi-part response.

The response message may acknowledgment value that acknowledges receipt of the control message. The response message may have a status value that indicates whether the command could be complied with or to what extent the command could be applied with. The status value may include data indicative of "bandwidth allocated" and "priority applied to stream." The status value may be response of the hint that the node may but is not required to act upon, for example, "bandwidth request received and allocation is acceptable at the current time." The status value may include data indicative of a partial compliance by a percentage or fraction such as "50% of bandwidth requested allocated." The status value may include data indicative of a reason why that command cannot be complied with, such as "an existing stream has priority" or "priority changes not permitted by on-path router."

The response message may include a portion of the original control message. The portion of the original control message may have a predetermined size (e.g., 64 bytes). The portion of the original control message may include information to process the error at the local endpoint 101 (e.g., IP header of the error packet (response packet), and the UDP header of the control message including the port number or a flow index value). The port number or flow index value may be a numerical value that distinguishes between different flows. That is, the local endpoint device 101 may send multiple flows, but designate a single flow to be given priority by the intermediate nodes 105 based on a port number or flow index value included in the control message and subsequent messages of the flow. In another example, the response message may include the entire control message and/or the entire command.

At stage F, communications are sent from the local endpoint device 101 to the remote endpoint device 115 by way of the intermediate nodes 105. At least intermediate node C, which has processed the command in the control message and in response, apply the bandwidth setting or priority settings to one or more flows included in the communications. This may provide feedback to the local endpoint device 101 as to the capabilities or availability of resources at the intermediate nodes 105.

In another example, the local endpoint device 101 may send a series of control messages with different counter values and receive a series of response messages. The local endpoint device 101 may send synchronized control messages so that each of the on-path routers between the local endpoint device 101 and the remote endpoint device 115 are synchronized to execute the same command. For example, applying the same high priority designation or bandwidth reservation for flows originating with the local endpoint device 101.

The series of control messages may have incrementing counter values. The first of the series of control messages may have a counter value of one, the second of the series of control messages may have a counter value of two, and so on until the Nth of the series of control message has a counter value of N.

The local endpoint device 101 may determine when to end the series of control message according to the number of intermediate nodes or on-path routers. Referring to the example of FIG. 2, if the counter value is set to 4 or higher, then none of the on-path routers will unpack the control message and execute the command. Accordingly, the remote endpoint device 115 would process the control packet and generate a reply message. The reply message may be a STUN response from the remote endpoint device 115. In another example, when the control packet is received at a port that is not in use on the remote endpoint device 115, the reply message may be an ICMP host port unreachable message. Upon receipt of the reply message, the local endpoint device 101 may identify the number of hops to the destination, compile a list of the on-path routers, and/or determine the maximum quantity for the series of control messages. In one example, the local endpoint device 101 may be configured to operate in a discovery mode in which the counter value is incremented in a series of message in order to compile the list of on-path routers, and also configured to operate in an implementation mode in which control message are sent to the list of on-path routers in order to modify a handling procedure for a flow by the on-path routers.

Figure 3:
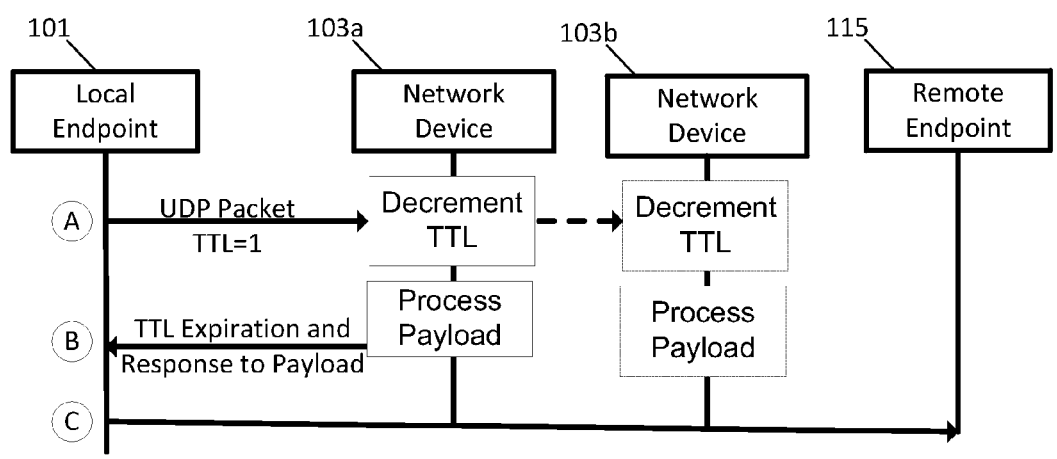
FIG. 3 illustrates an example timing diagram for communication with an on-path network device.

FIG. 3 illustrates an example timing diagram for communication with an on-path network device. The on-path network device may be one or more NAT devices between the local endpoint device 101 and the remote endpoint device 115. Before the embodiments described herein, chain of NAT devices may be difficult to identify.

The NAT device is natural choke point for the network because streams from multiple endpoints may go through the same NAT device. While this is a negative for network performance, the NAT device because a good point to evaluate the network.

Similar to the sequence in FIG. 2, the local endpoint 101 may sent a UDP packet to the one or more NAT devices 103a-b. The NAT devices may decrement the TTL or other counter value, and when the TTL expires at the NAT device, process a command included in the UDP packet. If the TTL has not expired, the network device 103a may forward the UDP packet to the next NAT device 103b. The control message be unpacked through the STUN and/or UDP protocols to read the DISCUSS attribute. The DISCUSS attribute may include any of the commands described above (e.g., a privacy setting, a recording setting, a service setting, bandwidth setting or a priority setting.)

The NAT device 103b may generate a response message (e.g., the ICMP response message described above including a payload of a STUN response). The response message may indicate that the hint was received and that the command is being complied with at the current time or cannot be complied with at the current time.

The local endpoint device 101 may send a series of control messages to a chain of NAT device in order to determine the number of NAT devices in the chain and the TTL value for each of the NAT devices. The series of control messages may have incrementing counter values. The first of the series of control messages may have a counter value of one, the second of the series of control messages may have a counter value of two, and so on until the Nth of the series of control message has a counter value of N.

The data indicative of the "TTL" of the NAT is good information as the bandwidth or other information coming from this node, or nodes close by, is particular valuable for the local endpoint 101 or a system administrator. If the NAT supports DISCUSS it can send responses directly to the client. If the NAT does not support DISCUSS the IP address of the NAT is discovered if a node after supports DISCUSS and adds a STUN response in the ICMP response.

Figure 4:
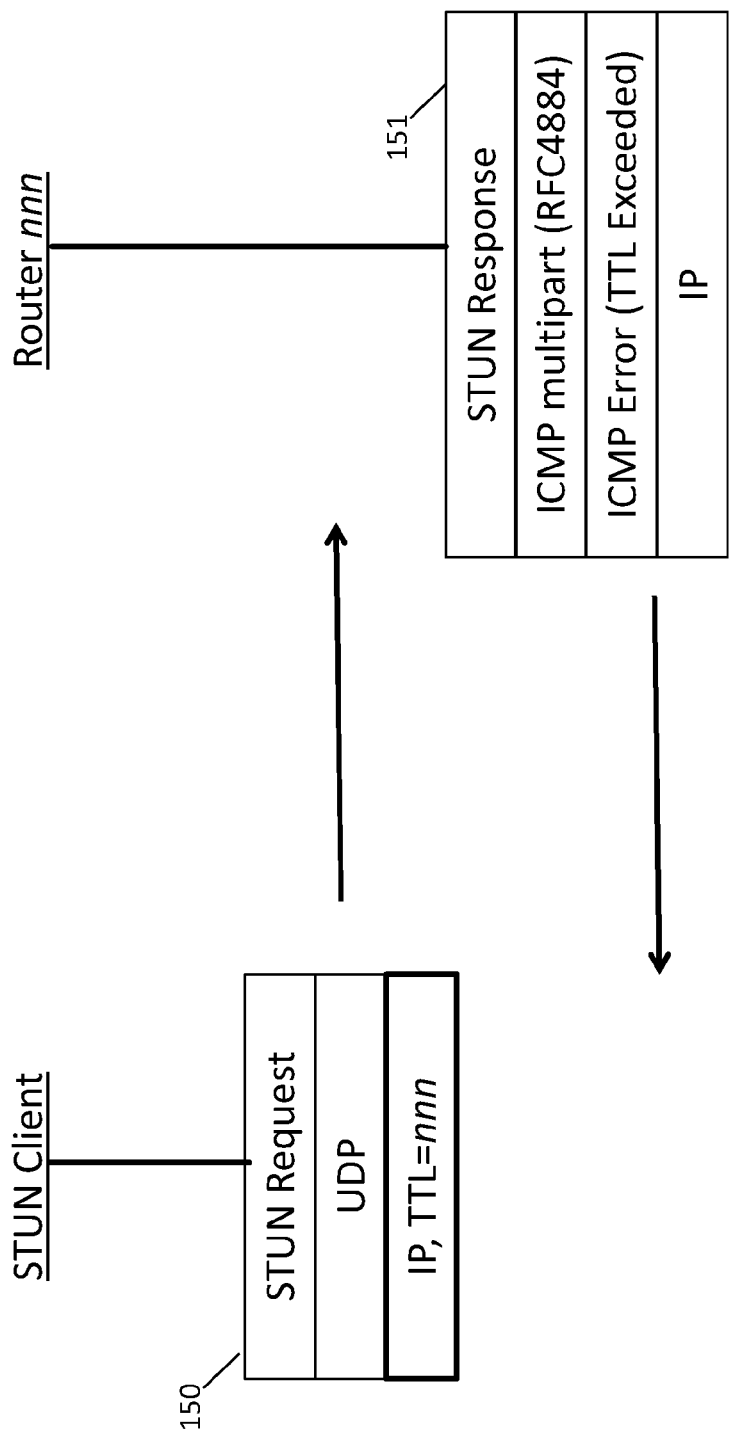
FIG. 4 illustrates an example control and response message.

FIG. 4 illustrates an example of the layered protocols of the control message 150 and response message 151. The control message 150 includes a STUN request encapsulating a UDP packet and includes data including a TTL value for nnn (a number) and an IP address of the source. The response message 151 includes a STUN responses encapsulating an ICMP multipart message and data indicating an ICMP error (e.g., that the TTL value has been exceeded) and an IP address from the control message.

Figure 5:
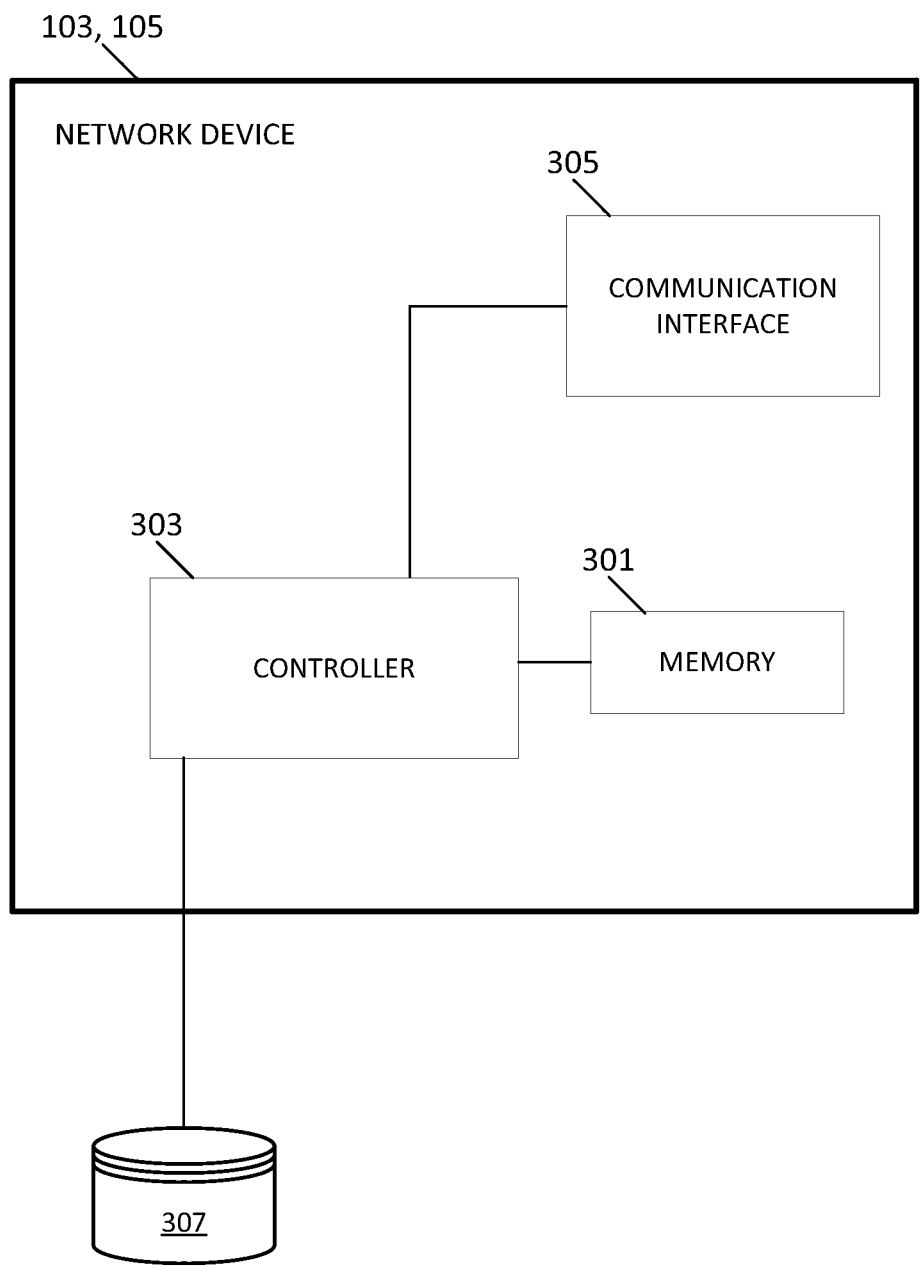
FIG. 5 illustrates an example network device for the systems of FIG. 1.

FIG. 5 illustrates an example network device 103 or intermediate node 105 for the networks of FIG. 1 of FIG. 2. The network device 103 includes at least a memory 301, a controller 303, and a communication interface 305. Additional, different, or fewer components may be provided. Different network devices may have the same or different arrangement of components.

Figure 6:
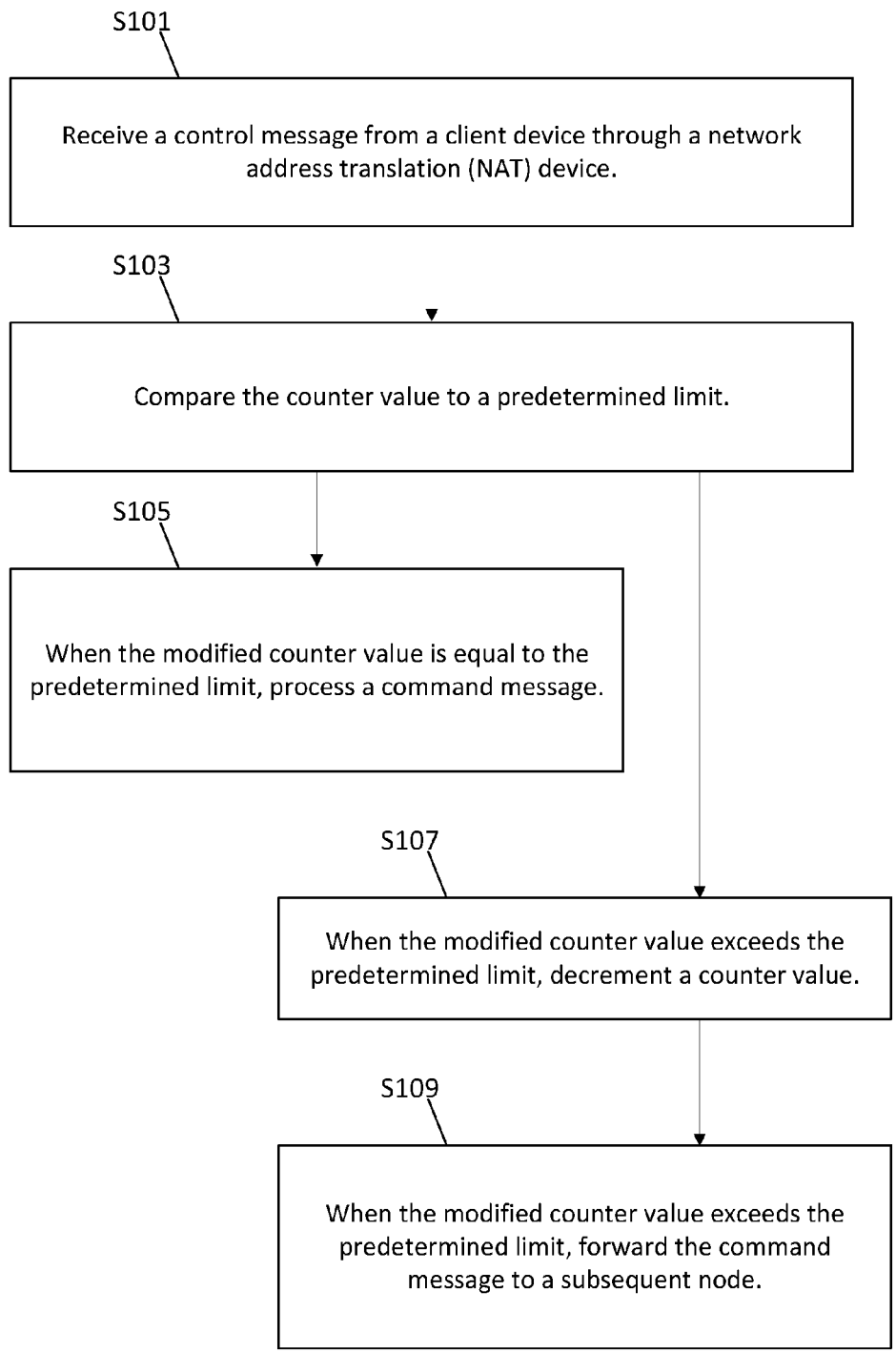
FIG. 6 illustrates an example flowchart for communication with on-path routers.

FIG. 6 illustrates an example flowchart for the network device 103. Additional, different, or fewer acts may be provided. The acts are performed in the order shown or other orders. The acts may also be repeated.

At act S101, the controller 303 or the communication interface 305 receives a control message from a client device through a network address translation (NAT) device. The control message may be a UDP packet or encapsulated in a UDP packet. The control message may be is a session traversal using NAT (STUN) message including a counter value and a command message.

At act S103, the controller 303 is configured to compare the counter value to a predetermined limit. The predetermine limit may be 0. At act S105, when the modified counter value is equal to the predetermined limit, process the command message. The command message may be a hint message or a required instruction. The command message may specify a resource allocation, a security policy, or a recording policy. Example resource allocations include bandwidth allocated for the stream and a priority of the stream with respect to other streams. The controller 303 may reply with a message that indicates whether the command message or hint message can be complied with in part or in full.

At act S107, when the modified counter value exceeds the predetermined limit the controller 303 is configured to decrement the counter value. At act S109, when the modified counter value exceeds the predetermined limit, the controller 303 or communication interface 305 is configured to forward the resource allocation message to a one or more subsequent nodes. At the subsequent node, or later node, when the modified counter value is equal to the predetermined limit, the subsequent node processes the command message. The command message may specify a resource allocation, a security policy, or a recording policy. Example resource allocations include bandwidth allocated for the stream and a priority of the stream with respect to other streams. The subsequent node may respond with an acknowledgment include a level of compliance with the command message.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The memory 301 is a non-transitory computer-readable medium, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
   receiving, from an endpoint, a control message including an encapsulated command for execution by an on-path router, wherein the encapsulated command specifies a setting for handling a flow for the on-path router through Differentiated prIorities and Status Code-points Using Stun Signaling (DISCUSS) for a direct exchange of information and a counter value;
   modifying the counter value;
   comparing, at a processor, the modified counter value to a predetermined limit;
   when the modified counter value is equal to the predetermined limit, designating the control message for execution of the encapsulated command; and
   when the modified counter value exceeds the predetermined limit, forwarding the control message to a subsequent node.

2. The method of claim 1, further comprising:
   generating an error message in response to the control message; and
   sending the error message to the endpoint.

3. The method of claim 2, wherein the error message includes data indicative of the modified counter value.

4. The method of claim 2, wherein the error message includes a response to the encapsulated command.

5. The method of claim 2, wherein the error message is a multi-part message for Internet Control Message Protocol (ICMP) including a DISCUSS message encoded within.

6. The method of claim 1, wherein the encapsulated command specifies one of a privacy setting, a recording setting, a service setting, or a bandwidth setting.

7. The method of claim 1, further comprising:
   executing the control message; and
   modifying a procedure for handling the flow according to the setting for handling the flow.

8. The method of claim 7, wherein modifying the procedure includes modifying the procedure to increase a priority of the flow.

9. The method of claim 7, wherein modifying the procedure includes modifying the procedure to reserve a resource.

10. An apparatus comprising:
    a communication interface configured to receive, from an endpoint, a control message including an encapsulated command specifying a setting for handling a flow for an on-path router through Differentiated prIorities and Status Code-points Using Stun Signaling (DISCUSS) for a direct exchange of information, and a counter value; and
    a processor configured to modify the counter value and compare the modified counter value to a predetermined limit,
    wherein when the modified counter value is equal to the predetermined limit, the processor is configured to designate the control message for execution of the encapsulated command and when the modified counter value exceeds the predetermined limit, the processor is configured to cause the communication interface to forward the control message to a subsequent node.

11. The apparatus of claim 10, wherein the processor is further configured to generate an error message in response to the control message and send the error message to the endpoint.

12. The apparatus of claim 11, wherein the error message includes data indicative of the modified counter value.

13. The apparatus of claim 11, wherein the error message includes a response to the encapsulated command.

14. The apparatus of claim 11, wherein the error message is a multi-part message for Internet Control Message Protocol (ICMP) including a DISCUSS message encoded within.

15. The apparatus of claim 10, wherein the encapsulated command specifies one of a privacy setting, a recoding setting, a service setting, or a bandwidth setting.

16. The apparatus of claim 10, wherein the processor is further configured to execute the control message and modify a procedure for handling the flow according to the setting for handling the flow.

17. The apparatus of claim 16, wherein the processor is configured to modify the procedure to increase a priority of the flow.

18. The apparatus of claim 16, wherein the processor is configured to modify the procedure to reserve a resource.

19. A non-transitory computer readable medium containing instructions that when executed are configured to:
    receive a control message from a client device through a network address translation (NAT) device, wherein the control message is a session traversal using NAT (STUN) message including a counter value and a resource allocation message specifying a setting for handling a flow for an on-path router through Differentiated prIorities and Status Code-points Using Stun Signaling (DISCUSS) for a direct exchange of information;
    modify the counter value;

compare, at a processor, the counter value to a predetermined limit;

when the modified counter value is equal to the predetermined limit, process the resource allocation message; and when the modified counter value exceeds the predetermined limit, forward the resource allocation message to a subsequent node.

20. The non-transitory computer readable medium of claim 19, wherein the instructions when executed are further configured to:

apply a priority to the flow based on the resource allocation message.

\* \* \* \* \*